United States Patent [19]
Kenney

[11] Patent Number: 5,515,424
[45] Date of Patent: May 7, 1996

[54] SYSTEM AND METHOD FOR PROVIDING SELECTED VIDEO IMAGES TO LOCAL TELEPHONE STATIONS

[75] Inventor: Brian Kenney, Somerset, N.J.

[73] Assignee: AT&T Corp., Murray Hill, N.J.

[21] Appl. No.: 166,496

[22] Filed: Dec. 13, 1993

[51] Int. Cl.⁶ ............................ H04M 11/00; H04N 7/14
[52] U.S. Cl. .................. 379/96; 379/93; 348/14; 348/17
[58] Field of Search .................. 379/93, 94, 96, 379/97, 98, 142, 143, 144, 155, 453; 348/13–19; H04N 7/14

[56] References Cited

U.S. PATENT DOCUMENTS

| 4,797,914 | 1/1989 | Vaello | 379/96 |
|---|---|---|---|
| 4,805,119 | 2/1989 | Maeda et al. | 379/96 |
| 4,850,007 | 7/1989 | Marino et al. | 379/67 |
| 4,943,995 | 7/1990 | Daudelin et al. | 379/67 |
| 4,953,196 | 8/1990 | Ishikawa et al. | 348/18 |
| 5,062,136 | 10/1991 | Gattis et al. | 379/96 |
| 5,218,633 | 6/1993 | Clagett et al. | 379/96 |

FOREIGN PATENT DOCUMENTS 0477080  3/1992  European Pat. Off. ......... H04N 7/14

OTHER PUBLICATIONS

The article "We can put you on a pedestal . . . on up against wall", Telephony, p. 43, Jun. 29, 1981.

*Primary Examiner*—Jason Chan

[57] ABSTRACT

A system and method for providing subscriber selected advertising in the form of video images to a local telephone station is disclosed. The telephone network includes a telephone line system and switch facility contained within the line system for forwarding calls made by a calling party from a local telephone station through the telephone line system to a destination point. The local telephone station is interfaced with the network. The phone includes a display monitor for receiving data corresponding to video images and displaying same. The images are stored in a central database and compressed into data packets of lesser bandwidth for transmission from the database through a network interface and into the existing telephone line system packet form to the local telephone station where they are arranged and decompressed for display on the monitor. A plurality of telephone stations can be grouped into a cluster unit. In this format, video data is preferably compressed, multiplexed, transmitted over the telephone network, demultiplexed and then decompressed for display at respective monitors.

19 Claims, 3 Drawing Sheets

SYSTEM AND METHOD FOR PROVIDING SELECTED VIDEO IMAGES TO LOCAL TELEPHONE STATIONS

FIELD OF THE INVENTION

This invention relates to a telephone system for providing subscriber selected video images to a local telephone station having a display monitor for receiving and displaying the video images.

BACKGROUND OF THE INVENTION

Major providers of commercial services such as telephone subscribers of toll-free 800 telephone services, airline reservation services, and other similar commercial services, spend much money catering to the world traveller. This is especially true with telephone subscribers of various telephone services as well as the telephone network providers themselves. It is difficult to advertise these services overseas. Often sales people must travel overseas to contact foreign nationals, or advertise directly in overseas newspapers and television commercials. This major "sales" effort is done to "catch" the international market, especially the world traveler.

Besides the use of an international sales force, some domestic United States telephone providers have proposed placing their technology overseas. This is sometimes difficult, however. Often there is a problem with a foreign country's right-to-use such technology since it may compete with the foreign country's national telephone service. Also, some of the technology must be certified and meet stringent customs duties.

This void in advertising to the international world traveler has been met to a certain degree by placing technologically advanced telephone stations, such as the AT&T Public Phone 2000, in airport terminals and other places such as hotels where these travelers tend to stay. These phones not only provide the standard transmitter and receiver for making local and international phone calls but also these phones have a color monitor which displays images such as a company logo for eight to ten seconds, or displays information in a selected language on how to use the phone. The Public Phone 2000 has a microprocessor contained in the phone station which controls the color monitor and allows other advanced telephone functions, thus catering to the international world traveler.

It would be desirable to use an existing phone having a display monitor to play selected still or video images, such as vendor and subscriber selected advertisements to the world traveller. It would also be desirable to selectively control these images depending on the location of the phone, i.e., the terminal, the time of incoming flights, their origin, and other factors. For example, a local telephone station positioned at an airport terminal may have travelers of different national origin visiting the area where that phone is located depending on what incoming flight has arrived to that terminal. Thus, the displayed advertisements on the monitor should change depending on these different parameters.

In some terminals, the local telephone stations are grouped closely adjacent to each other. Thus, it would be desirable to have different video images transmitted to different telephone stations so as to attract travelers of different nationalities toward the monitors. This would require even greater control and possibly multiplexing capabilities of the images from a central image database.

A major drawback of this desired system, however, is the use of the existing telephone line system. Video images have great bandwidth. Thus, transmission of video images over existing telephone network lines is difficult. One solution would be to place new cables used for image transmission from an image database to the local telephone. However, placing additional lines used only for carrying video images to a phone, such as a Public Phone 2000, in an airport terminal may be prohibitively expensive considering what the advertising could actually produce in generated revenue from the world traveler.

SUMMARY OF THE INVENTION

It is therefore an object of the present invention to select video images from a central location and transmit these images into a local telephone station interfaced to the telephone network where the station includes a display monitor for receiving and displaying the images.

In accordance with the system of the present invention, video images corresponding to selected subscriber advertisements are transferred over existing phone lines to a local telephone station interfaced to the telephone network. The images are displayed on the display monitor.

Video images are stored in a centralized database. The subscriber or network provider selects desired video images and compresses the data corresponding to the images by means such as an ATT AVP4000 video comparison chip set. The data is transmitted through the network to the local telephone station where it is uncompressed and the images displayed.

In accordance with the present invention the telephone network includes a telephone line system and switch means contained within the line system for forwarding calls made by calling parties from local telephone stations through the telephone line system to selected destination points. A local telephone station is interfaced to the network. The local telephone station includes a display monitor for receiving and displaying the video images corresponding to selected subscriber advertisements. A central database stores the video images. A controller selects the desired video images from the database based on preselected parameters such as the location of the local telephone station in the airport terminal, what kind of international travelers may tend to use the phone, the time of day and other similar factors. The central database interfaces the telephone network.

In accordance with the present invention, a video compression facility compresses the still or video images into data of lesser bandwidth for transmission from the database, through the interface, and into the telephone line system of the network to the telephone station via the network switch system. To ensure reliable transmission, the data is placed in packets using software and hardware known to those skilled in the art. In one aspect of the invention, each local telephone station includes decompression software and hardware for decompressing the compressed still or video images for displaying the images on the display monitor.

In another aspect of the present invention, the local telephone station includes a handset that is received within a telephone cradle as is conventional. The cradle includes a switch. The switch is operatively connected to the display monitor electronics in the local telephone station and terminates the image display after the handset of the telephone station is raised from its cradle.

In still another aspect of the present invention, a network control system is associated with the switch system of the network for controlling the routing of a call made from the local telephone station through the switch system. The network control system includes means for responding to a selected touch tone sequence at the local telephone station for prompting the image database to transmit preselected images to the local telephone station.

In still another aspect of the present invention, a plurality of local telephone stations are grouped together at a location such as in an airport terminal. The selected video images are compressed, placed in packets, and then multiplexed for transmission through the network. A video splitting mechanism in the form of a demultiplexer divides the multiplexed packets into individual packets for transmission to the respective local telephone stations in the cluster. Each transmission then is decompressed and the video image is displayed on the display monitor. In one aspect of the invention, the image database controller is located proximal to the cluster location. In still another embodiment, the controller is located proximal to the database location in the telephone network.

DESCRIPTION OF THE DRAWINGS

The foregoing and other objects and advantages of the present invention will be appreciated more fully from the following description, with reference to the accompanying drawings in which.

DETAILED DESCRIPTION OF THE INVENTION

Figure 1:
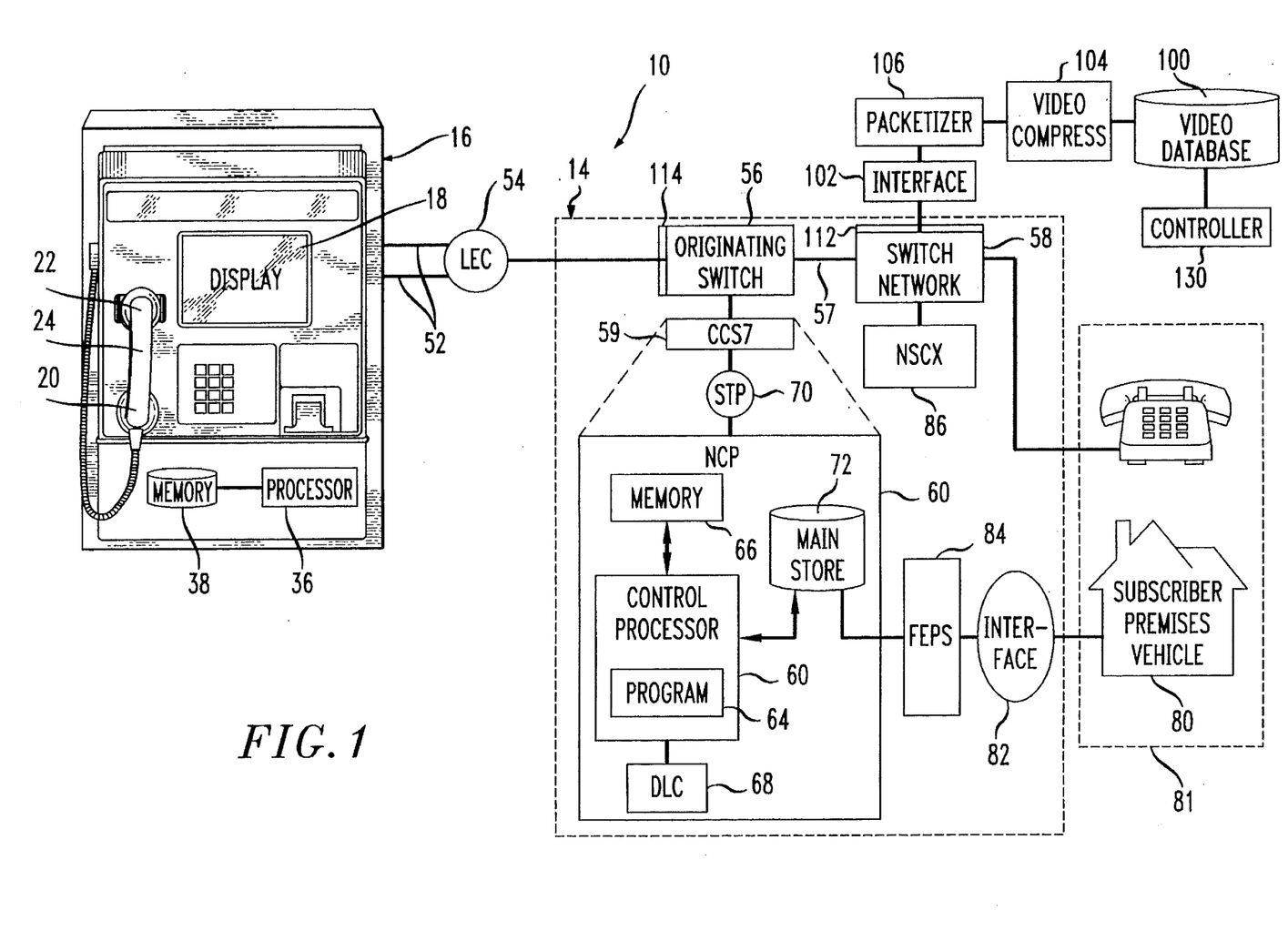
FIG. 1 is a block diagram of the telephone system that allows selected video images of a telephone subscriber to be transferred to a local telephone station having a display monitor for displaying the images.

Referring now to FIG. 1, there is shown a block diagram of the system indicated generally at 10, arranged in accordance with the present invention for transmitting video images to a local telephone station having a monitor for displaying advertising video images. The overall illustrated system shows a telephone switching network, indicated by the dashed outline 14 connected to a local telephone station indicated generally at 16, which in the foregoing described embodiment is a station having a display monitor 18 (FIG. 3) such as commonly used in the Public Phone 2000, (Phone 2000) presently manufactured and sold by AT&T.

For purposes of understanding, the foregoing description will proceed with a description of the local telephone station 16, the Phone 2000, which may be used by world travelers arriving at airports and other similar locations such as international hotels in the United States, followed by a description of the network and switching components in the context of the present invention. The description will also include the components and elements common to the use of 800 toll free services since many travelers may initially use such services when arriving at an airport terminal. The description of the telephone network 14 in conjunction with a description of the 800 toll-free service system components should aid understanding of the overall invention described herein.

Figure 2:
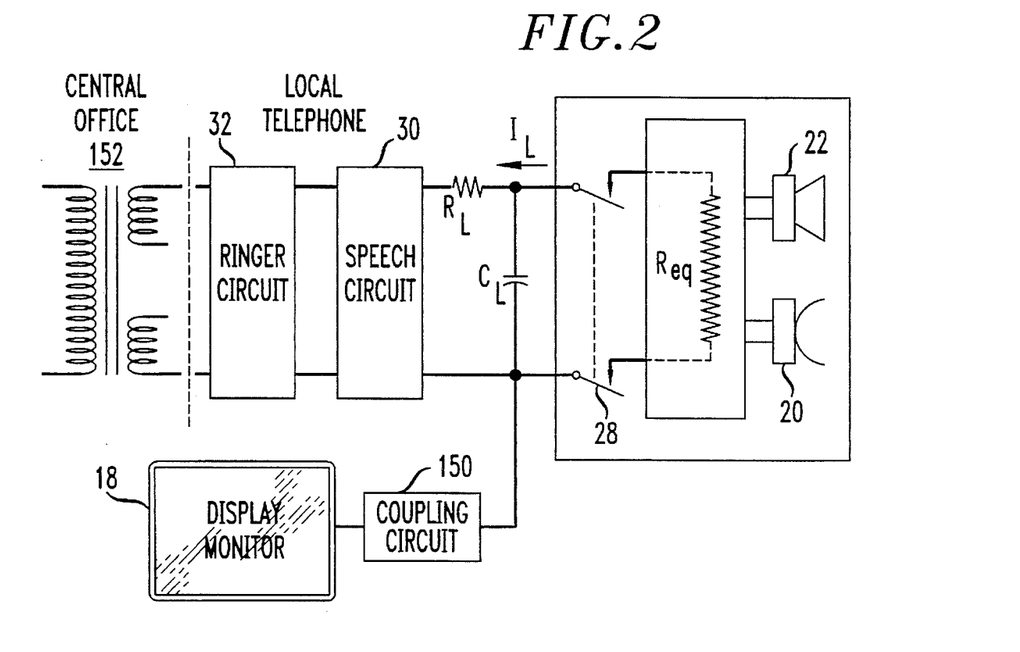
FIG. 2 is a schematic block diagram of a handset and switch mechanism for terminating the image display after the handset of the local station is raised from its cradle.
Figure 3:
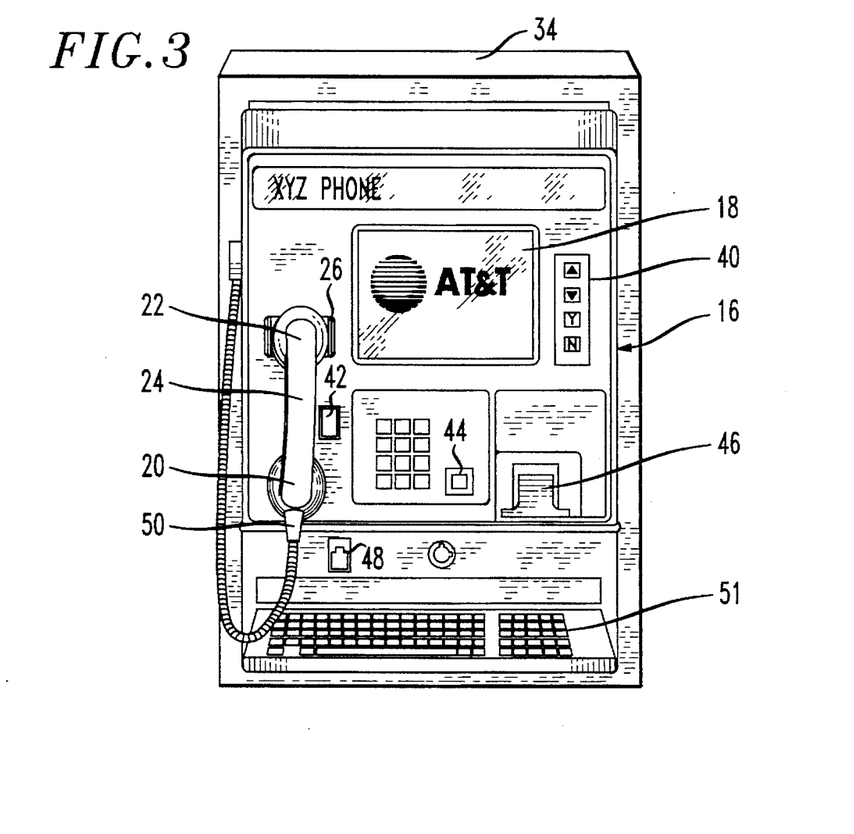
FIG. 3 is a schematic, elevation view of a local telephone station which may be used with the system and method of the present invention.

Referring now to FIG. 3, there is illustrated a local telephone station 16, such as the ATT Public Phone 2000. The phone 16 includes the normal transmitter 20 and receiver 22 contained in the handset 24 which is received in the telephone cradle 26, where it depresses a conventional switch(es) 28 to activate the "off" state (FIG. 2). When the handset 24 is raised, the dial network is activated, and a dial tone is registered. The telephone station also includes a standard speech circuit 30 and ringer circuit 32 as is conventional.

As shown in FIG. 3, the phone, even though it has a display monitor 18, is small, and fits into major existing telephone frame-housing members 34 found in the airport terminals and hotels frequented by international travelers. This small size facilitates replacement of older model phones with the Phone 2000. The Phone 2000 works from commercially available 120 V AC.

The phone has a high resolution, nine inch color monitor 18 that displays both graphics and text, 640×480 pixels, with 256 VGA color capability. The phone includes its own microprocessor 36, shown in block diagram in FIG. 1.

In a conventional telephone network system, the monitor 18 would display informational screens for a period of 8–10 seconds each when the phone is not in use. These still images are stored in a memory module 38, which could be a disk drive, in the phone. In some cases, the data could be downloaded from a central administration point. The phone includes menu driven function buttons 40 designed to operate in a manner similar to automatic teller machines. These buttons, which are labeled with an up and down arrow buttons, and, (enter/yes) and (cancel/no) buttons will enable travelers to control feature selection (FIG. 3).

The phone also includes a volume control button 42 that raises or lowers volume about twenty decibels, five decibels at a time. A new call button 44 allows travelers to place a call by simply pressing a new call button after they are finished with their call, thus eliminating the need for reentering their calling card number.

A standard credit card insert 46 receives the customer's calling card. A data port 48 is equipped with an RJ11 modular connector, enabling travelers to connect a lap top computer or portable facsimile machines to the phone, by simply plugging in and following instructions on the screen. The grommet 50 on the phone cord identifies the phone as hearing aid compatible and signifies that the person with a hearing aid will not receive any feedback when using the phone. The lower part of the phone 16 includes a conventional computer keyboard 51 which is used for data input.

The local telephone station 16 connects via at least two separate lines 52 (which could also be four lines depending on the system) to a local exchange switch 54 (which may be a 5ESS® Electronic Switching System available from AT&T) typically owned and operated by a Local Exchange Company (LEC). Calls made from the local telephone station are transferred from the local exchange switch 54 to an "originating" switch 56 (which may be a 4ESS® Electronic Switching System available from AT&T). The originating switch is connected into the switched network 58 and routes the call through the network to its destination via the existing phone line system 57.

For purposes of understanding, other components of the system such as the network control point used for providing the logic for routing toll-free 800 numbers is illustrated and described. Often international travelers call 800 subscribers such as hotels, airlines, and even network providers such as AT&T after they arrive in an airline terminal or hotel. The toll-free 800 number call is described for purposes of understanding the network switch system, followed by a more detailed description of the video system of the present invention.

A calling party initially raises the handset 24 off its cradle 26, and the local exchange company via the local exchange switch 54 returns the dial tone. The calling party then dials a subscriber's 800 number and the call is transmitted to the local exchange switch 54 which verifies the 800 number. The switch then forwards the call to the telephone network 14 which services the calls to that 800 number. The call is transferred to the originating switch 56. The originating switch 56 takes the call and signals back to the local operating company that it has received the call and to maintain the circuit open for voice transmission.

The originating switch 56 then plays back to the customer the tones for the on-line sound. During this screening process, the originating switch launches a query through the conventional common channel signalling network shown by the rectangle and dot-dash line 59 in FIG. 1 (CCS7) to the network control point (NCP) 60 which stores the appropriate Inward Wide-Area Telecommunication Service (INWATS) database. The INWATS database (IDB) is used to perform a 10-digit 800 to POTS number translation.

The query typically will include information concerning the dialed number and information identifying the calling party's location, such as an automatic number identification (ANI) for the line serving that location. Other information could also concern the time of day. This query typically is made in the form of a data message transmitted to the NCP 60 via the CCS7 network signalling link.

The network control point 60 includes a control processor 62 which operates under the control of a program 64 stored in memory 66 and a data link controller (DLC) 68, which operates to transmit and receive data messages to and from switches via a signal transfer point 70.

The signal transfer point 70 is a very high capacity, reliable packet switch that transport signalling messages between network nodes such as switches and network control points. They perform routing functions and terminate a large number of signalling links performing protocol processing and routing of a high volume of messages through the links.

The network control point 60 also includes a main data storage unit 72 which could be a number of memory disk units. This data storage unit 72 contains translation data that is used to translate a telephone number accompanying a request message into a primary destination code. This destination code could be the address of the destination toll switch or telephone number identifying the called station. If the destination code is a telephone number, then a toll switch in a conventional manner translates the telephone number into an address identifying the destination toll switch.

The network control point 60 retrieves or "executes" a subscriber record associated with the received dialed number in order to obtain a routing number used to direct the originating switch where to route the call. This routing number of course could be sensitive to call origination locations. As explained in detail below, the subscriber can formulate a routing plan whereby, calls from customers in one region are routed to a first service center in that region, while calls from customers in another region which are placed to the same 800 number can be routed to a second service center in another geographic location.

The routing number also may contain a code that can be interpreted by the switch 56 as providing multiple, sequential routing choices. Thus, when the originating switch receives the code, it can retrieve the table containing information defining the first choice routing, which is used, if available. The table also could contain information defining a second choice routing in the event the first choice is busy, out of service, or otherwise unavailable. The table may also include information defining additional routing choices. This is particularly advantageous to provide back-up capability in the event that a particular network element is temporarily inoperative.

The network subscriber for the 800 services typically has a premises vehicle 80 subscriber's location of business (indicated by dashed line 81). The premises vehicle 80 is operatively connected to an interface 82 a routing control system 84 as part of the network control point 60. The premises vehicle 80 allows a subscriber to go into the network and make changes to the routing logic. In the described embodiment, the routing manager is a software application that sits presently on a work station situated at the subscriber's location. The work station can be any Unix software based work station capable of running a platform manager such as the ATT Platform Manager.

Customer's may design their routing logic and formulate routing logic into executable commands that would be executed in the network. The routing control system 84 of the network is termed "front end processors" (FEPS) which are interfaced with the network database 72 of the network control point 60. A non-programmer at the subscriber premises can create a new service by stitching together functional boxes to describe the routing scenario for a call.

A "call prompter" service may be provided where a calling party is connected to a network services complex 86 (NSCX) having a data base (also referred to as an announcement frame) where announcements are stored (FIG. 1). This host complex is also referred to as the "announcement facility" and receives instructions from the network control point to play an announcement stored in its announcement frame. The calling party is connected and switched to the announcement facility 86 which is arranged to interact with the calling party using stored voice scripts so as to play announcements to the calling party and/or collect information from the calling party. This information can then be used for further processing of the call.

In accordance with the present invention, a centralized data base 100 holds digital data corresponding to selected subscriber advertisements of video images. This data base could be a number of disk drives, grouped together, to store various advertisements and video images selected by a vendor or network subscriber to be displayed on the monitor 18 of the phone 16. The stored video images correspond to advertisements such as from the network carrier itself (in the present instance ATT), a subscriber of network services (such as a hotel having an 800 number) or other advertising subscriber. The data base 100 can be a part of the overall telephone network 14 and interface with network components through data transmission lines 102 as is well known to those skilled in the art. Also, the data base 100 could be a storage facility at a location separate from the network 14.

A major drawback of transferring video images over the existing telephone network phone lines 57 is extensive bandwidth required of video and other similar graphic and pictorial images. This has made transmission of video images over the existing phone line system 57 impractical.

Recent advances in video compression technology now allow the use of video compression techniques to compress the stored video images into data of lesser bandwidth for transmission from the data base 100 through the network interface 102 and into the existing telephone line system 57. A video data compressor 104, such as an AVP4000 video compression chip set, now available from AT&T, provides the new technology required to compress the video images into data for transmission across the standard network telephone lines 57. After compression, the data is typically packetized into discrete packets for transmission through the network by hardware and software 106 known to those skilled in the art. (Naturally, any network facilities can include ISDN fiber facilities).

The data packets are transferred through the network 14 to the public telephone station 16 where the existing processor 36 has software that rearranges the packets in proper order, decompresses the packets, and displays the images on the monitor 18. The software and hardware used in such process is well known to those skilled in the art. It has been determined that one minute of video to be displayed on a public telephone station 16 such as the Phone 2000 monitor, can be downloaded from the database in compressed packetized form over the existing telephone network lines in about 15 minutes. That one minute video can be played continuously, which is a great improvement over the eight second still frame image currently imaged on the Phone 2000 monitor.

Figure 5:
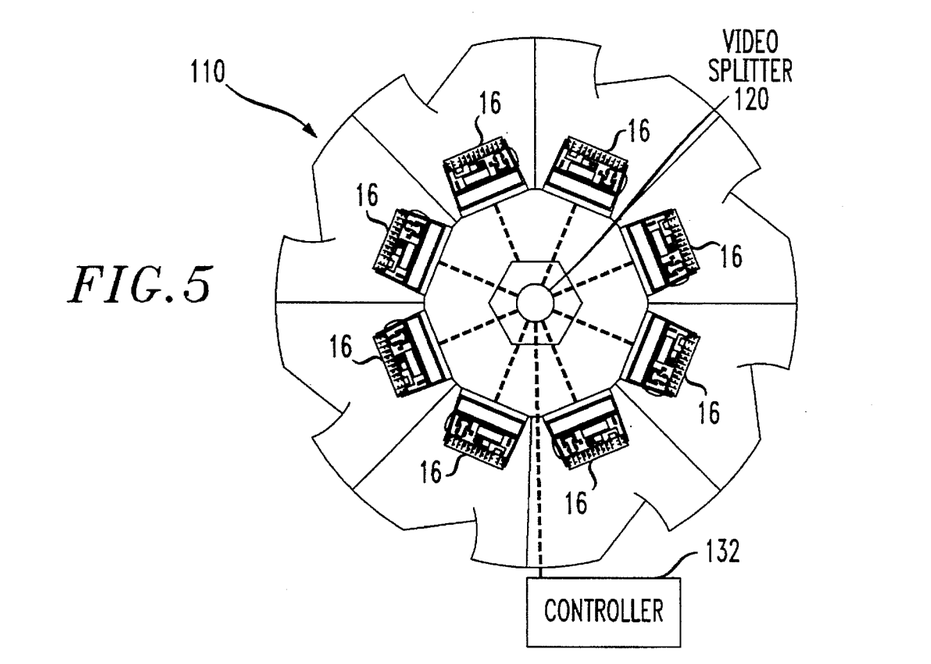
FIG. 5 is a schematic drawing of a clustered arrangement of a group of local telephone stations used with the system of the present invention.

As shown in FIG. 5, typically, a plurality of the public telephone stations 16 (Phone 2000) could be grouped together in a cluster 100 at an airport or hotel and form a single unit. This could save on wiring and is more functional to the location since less physical space is required at busy, crowded airport terminals. Each public telephone station in the cluster could play a different video image which plays in a different language, or a separate advertisement video. In this manner, a customer could be interested in different videos playing on different phones. This is especially useful when international flights have arrived at the terminal that includes many different persons of different nationalities that speak different languages.

The compressed packets could be multiplexed such as by conventional time division multiplexing, using telephone system equipment 112 well known to those skilled in the art. The multiplexed signals then are transmitted through the network 14 to the switch 56. The signal is demultiplexed by conventional means 114 and sent via local switch 54 to respective local telephone stations 16 in the cluster 110 where they are rearranged as necessary, and then decompressed. The images then are displayed on the monitor 18. Also, a video splitting mechanism 120 (FIG. 5) may split the same video several different ways which allows display of the same video on different telephone stations in the cluster. Naturally, as one skilled in the art is aware, the phones do not have to be clustered together for the multiplexing system arrangement as described to be used.

A controller 130 (FIG. 1) is operatively connected to the image database 102. The controller 130 selects the desired images which are compressed, packetized and transmitted through the telephone network 14. The subscriber (customer) has input to the controller such as by telephone access to a human operator or via a touch tone sequence code which can be developed by those skilled in the art for selecting desired images.

In some instances, a local controller 132 may be situated adjacent the cluster 110 for selecting videos that are to be played on the various display monitors 18. The local controller 132 could be positioned at a location adjacent the cluster 110, or within the cluster, as long as access is provided. The location of the controller 132, however, can be positioned in various numerous locations based on the desire of those skilled in the art.

Typically, small modifications to the local telephone station 16 will have to be made to accommodate video downloading into the phone 16. These may include modifications to the existing phone lines from the local switch 54 such as the addition of an extra set of lines to accommodate the data or changes in the internal circuitry of the phone 16 itself. These choices are available to one skilled in the art. A separate line system just for video transmission would free up some phone resources so that the phone could be used through the existing phone lines as the video image data is downloaded into the phone. Using as much of the existing phone line system 57 is naturally the more economical approach in the short term.

It is also possible for the subscriber to use a service such as the toll free 800 service where a calling party call a subscriber via the 800 service. The network control point is queried, and the database in the NCP returns data information stating that the call should be switched to the NCSX facility. Announcements are played indicating the selection of certain keys for generating a touch tone sequence. Upon generation of a selected touch tone sequence, the NCP prompts the image database to transmit preselected video images to the local telephone station 16.

As shown in FIG. 2, when the handset 24 is raised off the cradle 26 a switch 28 in the phone is activated and the video transmission is terminated via coupling circuit 150 (FIG. 2). At the same time, the phone loop circuit to the local exchange central office 152 is completed, allowing the local exchange company to send a dial tone. The dial tone then signals that their local telephone station is now ready for dialing. Also, when the handset 24 is raised, a standard dialing instruction screen or other image stored in the local telephone stations database may be displayed.

Figure 4:
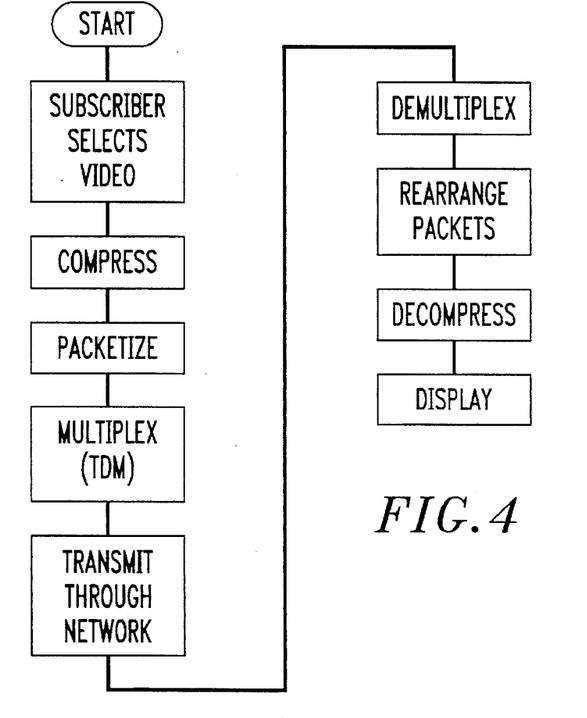
FIG. 4 is a high level flow diagram describing the method of the system of FIG. 1.

FIG. 4 illustrates a high level flow chart of the video image transmission to the local telephone station as described above.

It is to be understood that the above description is only one preferred embodiment of the invention. Numerous other arrangements may be devised by one skilled in the art without departing from the spirit and scope of the invention.

That which is claimed is:

1. A method for providing selected video images of a telephone network advertising subscriber to a local telephone station positioned at a cluster location comprising selecting data corresponding to video images from an image database contained within a telephone network, compressing the data corresponding to the video images while packetizing the compressed data into compressed data packets of lesser bandwidth, transmitting the compressed data packets through the telephone network, switching the data packets through the telephone network to the local telephone station, decompressing the data corresponding to the video images in the local telephone station, while also determining routing logic of a call through the telephone network as a function of different calling parameters from a call routing manager located at a premises location separate from the telephone network and operatively connected thereto, controlling the routing of the call made from the local telephone station through the telephone network by querying a network control database, and interacting with a caller and responding to a selected touch tone sequence made by the caller for routing the call to the image database for selecting and transmitting to the local telephone station preselected video images, and displaying the video images on a video display monitor.

2. The method according to claim 1 wherein the display of video images are terminated by raising a handset of the local telephone station from its cradle.

3. The method according to claim 1 including controlling the operation of the video display monitor by a microprocessor contained within the local telephone station.

4. The method according to claim 1 including controlling the selection of video images at a location proximal to the cluster location.

5. The method according to claim 1 including controlling the selection of video images at a location proximal to a database location.

6. A system for providing subscriber selected video images to a local telephone station comprising a telephone network including a telephone line system and switch means for forwarding a call made by a caller from the local telephone station through the telephone line system and switch means to a desired respective destination point, said local telephone station interfaced to said network, said local telephone station including a display monitor for receiving and displaying video images originating from a subscriber, an image database contained within the telephone network in which data information corresponding to the video images are stored, control means for selecting desired video images from said image database, means for compressing the data corresponding to said video images into data packets of lesser bandwidth for transmission from said database, decompression means at said local telephone station for decompressing said compressed data corresponding to said video images, means for displaying the video images on said display monitor and, network control means in said telephone network and associated with said switch means for controlling and routing the call made from the local telephone station through said switch means, a call routing manager located at a premises location of a network subscriber, said network subscriber being located at the premises location separate from the telephone network, wherein said call routing manager is operatively connected to said network control means for determining routing logic of the call through the switch means as a function of different calling parameters, and wherein said network control means includes means for interacting with the caller and responding to a selected touch tone sequence at said local telephone station for prompting said image database to transmit a preselected video image to said local telephone station based on the caller's selection.

7. The system according to claim 1 wherein said local telephone station includes a handset that is received within a cradle, and including switch means in said local telephone station for terminating the display of the video images after the handset of the local telephone station is raised off its cradle.

8. The system according to claim 1 wherein said local telephone station includes a microprocessor for controlling operation of said display monitor.

9. A system for providing subscriber selected video images to a plurality of local telephone stations comprising a telephone network including a telephone line system and switch means contained within said line system for forwarding a call made by a caller from one of the local telephone stations through the telephone line system and switch means to a desired respective destination point, said plurality of local telephone stations grouped in proximal vicinity to each other to form a local cluster, wherein each station is interfaced to said network, each station also including a display monitor for receiving and displaying video images of a subscriber, an image database contained within the telephone network in which data information corresponding to the video images is stored, control means for selecting desired video images from said database, means for compressing the data corresponding to said video images into data packets of lesser bandwidth for transmission from said database, means for multiplexing said packets for multiplexed transmission through said network, means for demultiplexing said multiplexed packets into individual packets for transmission to respective said local telephone stations situated within said cluster, decompression means at each local telephone station for decompressing the respective compressed data corresponding to said video images, means for displaying said video images on said display monitor and, network control means in said telephone network and associated with said switch means for controlling and routing the call made from said one of the local telephone stations through said switch means, a call routing manager located at a premises location of a network subscriber, said network subscriber being located at the premises location separate from the telephone network, wherein said call routing manager is operatively connected to said network control means for determining routing logic of the call through the switch means as a function of different calling parameters, and wherein said network control means includes means for interacting with the caller and responding to a selected touch tone sequence at said one of the local telephone stations for prompting said image database to transmit a preselected video image to said one of the local telephone stations based on the caller's selection.

10. The system according to claim 9 wherein said one of the local telephone stations includes a handset that is received within a cradle, and including switch means in said one of the local telephone stations for terminating the display of said video images after the handset of the one of the local telephone stations is raised off its cradle.

11. The system according to claim 9 wherein said one of the local telephone stations includes a microprocessor for controlling operation of said display monitor.

12. The system according to claim 9 wherein said cluster of telephone stations are grouped to form a single unit.

13. The system according to claim 9 wherein said control means is located proximal to the location of said cluster.

14. The system according to claim 9 wherein said control means is located proximal to the location of said database.

15. A method for providing subscriber selected video images to a plurality of telephone stations comprising

- selecting data corresponding to a plurality of video images from an image database contained within a telephone network,
- compressing the data corresponding to the video images while also packetizing the data into data packets of lesser bandwidth,
- multiplexing the packets,
- transmitting the compressed and multiplexed data packets through the telephone network,
- switching the data packets through the telephone network to a destination switch and then demultiplexing the packets,
- transmitting the data packets to respective said local telephone stations,
- arranging the data packets in order while decompressing the data corresponding to the respective video images at each local telephone station,
- while also determining routing logic of a call through the telephone network as a function of a different calling parameters from a call routing manager located at a premises location separate from the telephone network and operatively connected thereto,
- controlling the routing of the call made from one of the local telephone stations through the telephone network by querying a network control database, and interacting with a caller and responding to a selected touch tone sequence made by the caller for routing the call to the image database for selecting and transmitting to said one of the local telephone stations preselected video images, and
- displaying the video images on a video display monitor.

16. The method according to claim 15 wherein the display of video images is terminated by raising a handset of the one of the local telephone stations off from its cradle.

17. The method according to claim 15 including controlling the operation of the video display monitor by a microprocessor contained within the one of the local telephone stations.

18. A system for providing subscriber selected video images to a local telephone station comprising

- a telephone network including a telephone line system and switch means contained with said line system for forwarding a call made by a caller from the local telephone station through the telephone line system and switch means to a desired respective destination point,
- said local telephone station interfaced to said network, said local telephone station including a display monitor for receiving and displaying video images originating from a subscriber,
- an image database in which data information corresponding to video images are stored,
- control means for selecting desired video images from said database,
- means for interfacing with said image database and said telephone network for allowing transmission of data corresponding to said video images from said database into said network,
- means for compressing the data corresponding to said video images into data packets of lesser bandwidth for transmission from said database, through said interface means and telephone line system into said local telephone station,
- decompression means at said local telephone station for decompressing said compressed data corresponding to said video images,
- means for displaying the video images on said display monitor and,
- network control means, in said telephone network and associated with said switch means for controlling and routing the call made from the local telephone station through said switch means,
- a call routing manager located at a premises location of a network subscriber, said network subscriber being located at the premises location separate from the telephone network, wherein said call routing manager is operatively connected to said network control means for determining routing logic of the call through the switch means as a function of different calling parameters and, wherein said network control means includes means for interacting with the caller and responding to a selected touch tone sequence at said local telephone station for prompting said image database to transmit a preselected video image to said local telephone station based on the caller's selection.

19. A system for providing subscriber selected video images to a plurality of local telephone stations comprising

- a telephone network including a telephone line system and switch means contained within said line system for forwarding a call made by a caller from one of the local telephone stations through the telephone line system and switch means to a desired respective destination point,
- said plurality of local telephone stations grouped in proximal vicinity to each other to form a local cluster, wherein each station is interfaced to said network, each station also including a display monitor for receiving and displaying video images of a subscriber,
- an image database in which data information corresponding to the video images is stored,
- control means for selecting desired video images from said database,
- means interfacing with said image database and said telephone network for allowing transmission of data corresponding to said video images from said database into said network,
- means for compressing the data corresponding to said video images into data packets of lesser bandwidth for transmission from said database, through said interface means and telephone line system,
- means for multiplexing said packets for multiplexed transmission through said network
- means for demultiplexing said multiplexed packets into individual packets for transmission to respective said local telephone stations situated within said cluster,
- decompression means at each local telephone station for decompressing the respective compressed data corresponding to said video images,
- means for displaying said video images on said display monitor and,
- network control means in said telephone network and associated with said network switch means for controlling and routing the call made from the one of the local telephones stations through said switch means, a call routing manager located at a premises location of a network subscriber, said network subscriber being located at the premises location separate from the telephone network, wherein the call routing manager is operatively connected to said network control means for determining routing logic of the call through the switch means as a function of different calling parameters, and wherein said network control means includes means for interacting with the caller and responding to a selected touch tone sequence at said one of the local telephone stations for prompting said image database to transmit a preselected video image to said one of the telephone stations based on the caller's selection.

* * * * *